United States Patent
Spinelli

(10) Patent No.: US 9,540,492 B2
(45) Date of Patent: Jan. 10, 2017

(54) THERMOPLASTIC FILM

(71) Applicant: L'ISOLANTE K-FLEX S.R.L., Roncello (Mailand) (IT)

(72) Inventor: Carlo Spinelli, Roncello (IT)

(73) Assignee: L'ISOLANTE K-FLEX S.P.A., Roncello (Mailand) (IT)

( * ) Notice: Subject to any disclaimer, the term of this patent is extended or adjusted under 35 U.S.C. 154(b) by 0 days.

(21) Appl. No.: 14/573,357

(22) Filed: Dec. 17, 2014

(65) Prior Publication Data
US 2015/0166747 A1    Jun. 18, 2015

Related U.S. Application Data

(63) Continuation of application No. PCT/EP2014/000814, filed on Mar. 26, 2014.

(30) Foreign Application Priority Data

Mar. 27, 2013 (DE) .................. 10 2013 005 221

(51) Int. Cl.
| | |
|---|---|
| *C08L 23/28* | (2006.01) |
| *C08J 5/18* | (2006.01) |
| *F16L 58/10* | (2006.01) |
| *F16L 59/10* | (2006.01) |
| *C08K 3/00* | (2006.01) |
| *C08K 5/00* | (2006.01) |
| *C08K 5/02* | (2006.01) |
| *C08K 3/22* | (2006.01) |

(52) U.S. Cl.
CPC .............. *C08J 5/18* (2013.01); *C08L 23/286* (2013.01); *F16L 58/1063* (2013.01); *F16L 59/10* (2013.01); *C08J 2323/28* (2013.01); *C08J 2327/04* (2013.01); *C08J 2423/28* (2013.01); *C08J 2427/00* (2013.01); *C08K 3/0058* (2013.01); *C08K 3/2279* (2013.01); *C08K 5/0066* (2013.01); *C08K 5/02* (2013.01)

(58) Field of Classification Search
None
See application file for complete search history.

(56) References Cited

U.S. PATENT DOCUMENTS

| | | | | |
|---|---|---|---|---|
| 3,983,290 A | * | 9/1976 | Elcik ..................... | C08K 3/22 |
| | | | | 428/323 |
| 4,433,105 A | * | 2/1984 | Matsuda ................ | C08F 8/22 |
| | | | | 525/211 |
| 5,314,530 A | | 5/1994 | Wierer et al. | |
| 2012/0282432 A1 | | 11/2012 | Papazoglou et al. | |

FOREIGN PATENT DOCUMENTS

| | | |
|---|---|---|
| DE | 27 20 589 A1 | 12/1977 |
| DE | 31 11 899 A1 | 10/1982 |
| DE | 32 00 824 A1 | 7/1983 |
| DE | 37 43 662 A1 | 7/1989 |
| DE | 297 744 A7 | 1/1992 |
| DE | 10 2005 003 295 A1 | 7/2006 |
| EP | 0 308 191 A2 | 3/1989 |
| EP | 2 375 118 A1 | 10/2011 |
| GB | 1 425 079 A1 | 2/1976 |
| GB | 1 522 776 A1 | 8/1978 |

OTHER PUBLICATIONS

International Preliminary Report on Patentability, International Application No. PCT/EP2014/000814, dated Oct. 8, 2015 (9 pages).
John T. Lutz et al., "Impact Modifiers for PVC Modes and Mechanisms of Impact Modification," Journal of Vinyl Technology, vol. 15, No. 2, Jun. 1, 1993, pp. 82-99.
Sergei V. Levchik et al., "Overview of the Recent Literature on Flame Retardancy and Smoke Suppression in PVC," Polymers for Advanced Technologies, vol. 16, No. 10, Jan. 1, 2005, pp. 707-716.
R. Erro Zozaya et al., "PVC-Based Polymer Blends: A Review of the Methods of Study," Journal of Vinyl and Additive Technology, vol. 15, No. 3, Sep. 1, 1993, pp. 132-139.
German Search Report (Application No. 10 2013 005 221.1) dated Oct. 24, 2013.
International Search Report and Written Opinion (Application No. PCT/EP2014/000814) dated Jul. 9, 2014.

* cited by examiner

*Primary Examiner* — Satya Sastri
(74) *Attorney, Agent, or Firm* — Burr & Brown, PLLC

(57) ABSTRACT

A film is provided, including 10 to 20 weight percent of a thermoplastic elastomer, preferably a chlorinated polyethylene, 10 to 20 weight percent of a thermoplastic that is a chlorine-based plastic, less than 15 weight percent of a modifier that imparts predetermined mechanical properties to the film, and 20 weight percent or less of a nondiffusing plasticizer, less than 40 wt % of a filler and 20 wt % or less of a flame-inhibiting material.

3 Claims, No Drawings

THERMOPLASTIC FILM

CROSS REFERENCE TO RELATED APPLICATIONS

This application is a continuation of International Application No. PCT/EP2014/000814 filed Mar. 26, 2014, which designated the United States, and claims the benefit under 35 USC §119(a)-(d) of German Application No. 10 2013 005 221.1 filed Mar. 27, 2013, the entireties of which are incorporated herein by reference.

BACKGROUND OF THE INVENTION

1. Field of the Invention

The invention relates to a thermoplastic film.

2. Description of Related Art

Metallic jacketing has been used for decades to protect thermal insulation material from weathering influences and mechanical effects. Solutions of this type consist, for example, of stainless steel, aluminum alloys, zinc-galvanized steel, particularly in pipe form, and are mechanically affixed to cover the insulation material.

The advantage of such solutions resides in the frequently long service life and good mechanical resistance. The biggest disadvantage is that corrosion of the insulated piping may take place underneath the metallic jacketing and underneath the insulation layer to be protected. This problem arises because in the long run metallic jacketing can generally not be 100% sealed off from the outside. Moisture can therefore get underneath the metallic jacketing and penetrate into the insulation material on the piping. As a result, the insulation material is damaged and there may be ensuing corrosion of the piping to be protected.

In places with extreme weather conditions, for example, on an offshore platform, such a process may ensue after just 2 to 3 years and make it necessary to renew the insulation and the protective jacketing.

Nonmetallic jacketing is also known.

The main disadvantage of nonmetallic jacketing is that additional materials are needed to obtain an impervious enclosure around the pipework with nonmetallic jacketing. Adhesives, for example, neoprene adhesives, are used to tightly seal the jacketing, for example.

Other nonmetallic jacketing cannot be used because it is not sufficiently durable under the surrounding conditions or it is too costly, as in the case of Viton or Teflon for example.

EP 2 375 118 A1 relates to a thermoplastic PVC component comprising vegetable fillers for production of flexible hoses.

SUMMARY OF THE INVENTION

The invention has for its object to provide a film useful to protect insulation materials on piping in a comparatively simpler manner.

DETAILED DESCRIPTION OF THE INVENTION

The present invention proceeds from a film that includes the following constituents: 10 to 20 weight percent of a thermal elastomer which is a chlorinated elastomer, 10 to 20 weight percent of a thermoplastic which is a chlorine-based plastic, less than 15 weight percent of a modifier which is a resin with which in particular the mechanical properties of the film are predeterminable, less than 20 weight percent of a nondiffusing plasticizer, of a filler and also of a flame-inhibiting material.

It has surprisingly transpired that a mixture of a thermoplastic elastomer, in particular, chlorinated polyethylene, of a thermoplastic, in particular, PVC, of a plasticizer such as, for example, chloroparaffin together with a predetermined amount of flame-inhibiting material, in particular, brominated flame-inhibiting material do not have the disadvantages of known membranes for protection, in particular, from moisture.

The inventors found that films of this type can be thermosealed, thermofused and solvent adhered. In addition, the material can be attached like conventional films or membranes, in particular cut and bent into the right shape.

A thermal elastomer and a thermoplastic combined with a modifier based on ethylene in particular are the basis of the mixture. The requisite type and the amount of plasticizer in the mixture are determined in particular by a desired elasticity and stress-withstanding capacity of the film for a predetermined use. This may differ, for example in accordance with the temperature range in the desired mode of use. Fillers in the mixture of the film may be selected such that they have, for example, good fire resistance properties and/or good smoke avoidance properties. A filler may further determine the color of the end product.

In one preferred embodiment of the film, the film comprises a predetermined amount of a flame-inhibiting material such that Euroclass B of European standard specification EN 13501 can be complied with. This is the best fire protection class for industrial and dock applications. Owing to the material's low level of heat development, the smoke gas emission test to IMO A-563 or IMO RES 61 (67) is not required.

The table which follows specifies the Constituents—thermoplastic elastomer, thermoplastic, modifier, filler, flame-inhibiting material and also plasticizer—as exemplary particularized ingredients and also the preferred weight percentage contribution to the overall mixture.

TABLE

| Constituent | Possible ingredients | Weight fraction |
| --- | --- | --- |
| thermoplastic elastomer | chlorinated polyethylene | 10-20% |
| thermoplastic | PVC (polyvinyl chloride) PVC-VA copolymer polymerized PVC copolymer with ACR | 10-20% |
| modifier | ketone ethylene ester resin ethylene methyl acrylate resin ethylene ethyl acrylate resin ethylene butyl acrylate resin | <15% |
| filler | aluminum hydroxide magnesium hydroxide magnesium oxide gibbsite/brucite hydrotalcite calcium carbonate zinc hydrox stannate zinc borate | 0-40% |
| flame-inhibiting material | antimony trioxide decabromodiphenylethane 2,4,6-tris(2,4,6-tribromo phenoxy)-1,3,5 Brominatex epoxy polymer | 1-10% 5-15% |

TABLE-continued

| Constituent | Possible ingredients | Weight fraction |
|---|---|---|
| plasticizer | chlorinated paraffins fatty acid polyester dibutoxyethyl phthalate trioctyl trimellitate | 5-20% |

The individual constituents may also be a mixture of the individual ingredients. For example, the thermoplastic may also be a mixture of PVC and PVC-VA in a predetermined mixing ratio.

The resins may be selected according to the desired mechanical properties and/or any surrounding conditions.

The mixture for producing the film may further comprise an added dye, for example titanium oxide or carbon, to obtain color effects in the black, gray and white region. The proportion of carbon is preferably less than 10 weight percent, that of titanium oxide is preferably less than 5 weight percent.

The filler may also be selected according to which mechanical properties and/or flame-inhibiting properties are desired.

The flame-inhibiting material shall preferably be selected for establishing the flame-inhibiting properties. However, mechanical properties can thereby also be influenced to a certain extent.

The flame-inhibiting material antimony trioxide is preferably used in a range of 1 to 10 weight percent. The flame-inhibiting material decabromodiphenylethane is preferably used in a range of 5 to 15 weight percent.

The proportion of plasticizer is preferably in a range of 5 to 20 weight percent. The plasticizer is preferably also used to establish the flame-inhibiting property and the glass transition point (TG value).

The film according to the present invention is preferably produced using the following steps.

Assembling and combining the mixture for producing the film is preferably effected in a mixer unit equipped with an automatic loading and weight control system in order to achieve a consistent quality and properties for the mixture. The mixer unit preferably consists of an internal mixer equipped with intermeshing rotors which is operated in automated fashion. From the mixer unit, the material may pass to a two-roll stand equipped with a stock blender in order to cool the mixture and make uniform distribution of all ingredients possible.

A four-roll calender follows in a subsequent step. This machine is intended to predetermine the structure of the mixture particularly as regards a desired thickness and width for the film.

After calendering, the film is cut to a predetermined width and cooled, for example, by means of water or air. The film is subsequently rolled up together with a release liner to separate the surfaces.

The film according to the present invention makes it simple to realize predetermined fittings. This can be done by cutting, for example. The joining together of cut edges to form a final shape can be done by means of thermofusing.

Thermoforming is another possible way to achieve shaping.

This makes it possible to realize one-piece shapes of differing configuration.

The following use is conceivable.

An insulation system preferably comprises 4 base components which specify the various elements for insulation and covering.

1. There is first of all the pipe which is to be insulated. Pipe diameter may amount to meters or centimeters, e.g., 1 cm to 2 m.

What matters is what is transported in the pipe, at which pressure and at which temperature. Water or chemicals are concerned, for example.

2. The next aspect to be considered is the pipe shape, with any branching necessitated by a landscape or a track across an industrial site.

One essential point of the insulation system is the insulation itself to protect the pipe and its contents from any undesirable external influences. These various requirements lead to various insulation materials, for example, glass wool, rock wool, elastomeric foam, polyurethane foam, to name but a few of the most commonly used ones. The insulation may also be a combination of these materials. And further materials may also be used to effect an optimization as regards an acoustical insulation for noise absorption or noise reduction.

4. The insulation material must finally be protected against external influences such as moisture, cold, heat, UV light, pressure and the ingress of moisture into the insulation. This is where the film according to the present invention is used, by means of which an insulation shell is simple to seal off hermetically from the surroundings.

Seams can be sealed without problems by thermofusing on the pipe itself without it being necessary to have to use an additional substance or material such as glue or putty.

This form of bonding may be effected for the complete system including any fittings. Seams of this type have a comparatively better level of stability than the film itself. In addition, a seam due to cold fusion with a solvent or adhering with a neoprene adhesive may be used as a further possibility. In principle, the film according to the invention has the advantage that no additional material is required to seal seams and butt joints, making for simple handling and safe use.

The invention claimed is:

1. A film comprising:
    10 to 20 weight percent of a chlorinated thermoplastic elastomer with respect to a total weight of the film, wherein the chlorinated thermoplastic elastomer is a chlorinated polyethylene;
    10 to 20 weight percent of a thermoplastic with respect to the total weight of the film, wherein the thermoplastic is a chlorine-based plastic;
    less than 15 weight percent of a modifier with respect to the total weight of the film, wherein the modifier is a resin that imparts predetermined mechanical properties to the film;
    20 weight percent or less of a nondiffusing plasticizer with respect to the total weight of the film;
    less than 40 weight percent of a filler with respect to the total weight of the film; and
    20 weight percent or less of a flame-inhibiting material with respect to the total weight of the film, wherein the flame-inhibiting material comprises 1-10 weight percent antimony trioxide with respect to the total weight of the film and 5-15 weight percent decabromodiphenylethane with respect to the total weight of the film.

2. The film according to claim 1, wherein the film comprises 5 to 20 weight percent of the plasticizer with respect to the total weight of the film.

3. The film according to claim 1, wherein the flame-inhibiting material complies with Euroclass B of the European standard specification EN 13501 except for the smoke emission test.

* * * * *